D. B. CLEMENT.
Horse Hay Fork.
No. 46,047. Patented Jan'y 24, 1865.
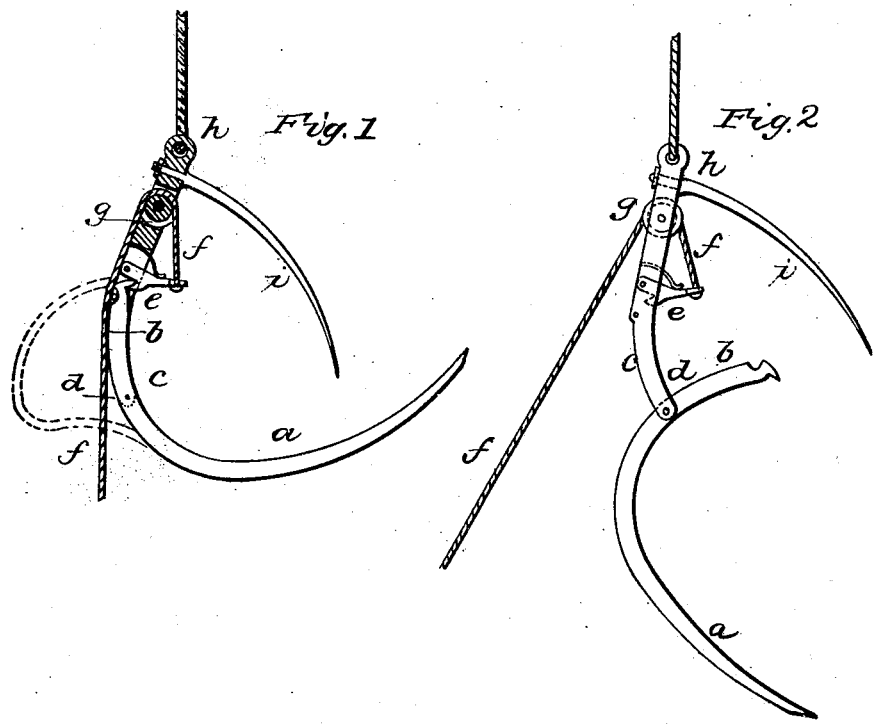
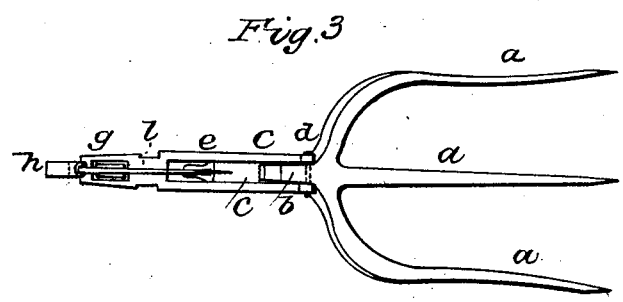
Witnesses
Lemuel W. Serrell
Thos. Geo. Harold
Inventor
D. B. Clement

UNITED STATES PATENT OFFICE.

DANIEL B. CLEMENT, OF BROOKLYN, NEW YORK, ASSIGNOR TO HIMSELF AND DUANE H. NASH, OF SAME PLACE.

IMPROVEMENT IN HORSE HAY-FORKS.

Specification forming part of Letters Patent No. 46,047, dated January 24, 1865; antedated July 24, 1864.

*To all whom it may concern:*

Be it known that I, DANIEL B. CLEMENT, of Brooklyn, Kings county, State of New York, have invented, made, and applied to use a certain new and useful Improvement in Hay-Elevators; and I do hereby declare the following to be a full, clear, and exact description of the said invention, reference being had to the annexed drawings, making part of this specification, wherein—

Figure 1 is a side elevation, partially in section, showing the fork ready for use. Fig. 2 is a side view with the parts in the position assumed after the hay has been delivered, and Fig. 3 is a plan.

Similar marks of reference denote the same parts.

The nature of my said invention consists in a hay-elevating fork formed with a latch, acting at the end of a metal stock to disconnect the fork for dumping, in combination with a link that becomes a connection between the fork, the latch, and the hoisting apparatus; and I employ a tooth that penetrates the hay to hold the same on the tines.

In the drawings, $a\ a\ a$ are the tines, united together and forming the stock or handle $b$.

$c$ is a double link outside the stock $b$, and united thereto by a rivet or screw at $d$.

$e$ is a spring-latch between the parts of the link $c$, taking the end of the stock $b$, and from which the discharging-rope $f$ passes over the pulley $g$ to the attendant; and $h$ is the eye or hook connected to the hoisting-rope by a block or other device, as usual.

$i$ is a tooth extending from the link $c$, curved from the point $d$, so that when the link $c$ is swung up to place said tooth shall pass into the hay above the tines $a$ and retain said hay in place while being elevated.

It will be evident that when the latch $e$ is disconnected, by pulling on the rope $f$ the hay will be delivered or discharged from the elevator, the parts swinging by the weight of the hay into the position shown in Fig. 2.

What I claim, and desire to secure by Letters Patent, is—

1. The arrangement of the link $c$, connecting the hay-elevating fork with the hoisting mechanism, and provided with the latch $l$, in combination with the metallic stock or handle, as specified.

2. The tooth $i$, fitted to swing over the tines for holding the hay in its place on said tines, as specified.

In witness whereof I have hereunto set my signature this 2d day of February, A. D. 1864.

D. B. CLEMENT.

Witnesses:
LEMUEL W. SERRELL,
THOS. GEO. HAROLD.